United States Patent

[11] 3,608,068

| [72] | Inventors | George H. Fuller<br>Colonia;<br>Stephen Klisch, Somerset, both of N.J. |
|---|---|---|
| [21] | Appl. No. | 809,035 |
| [22] | Filed | Mar. 20, 1969 |
| [45] | Patented | Sept. 21, 1971 |
| [73] | Assignee | Colgate-Palmolive Company<br>New York, N.Y. |

[54] FLAVOR COMPOSITION
5 Claims, No Drawings

| [52] | U.S. Cl. | 424/49, 99/140 |
|---|---|---|
| [51] | Int. Cl. | A61k 7/16 |
| [50] | Field of Search | 424/49–58; 99/140 |

[56] References Cited
UNITED STATES PATENTS

| 1,645,793 | 10/1927 | Brownlee | 424/51 |
|---|---|---|---|
| 3,181,952 | 5/1965 | Mastrangelo | 99/71 |
| 3,227,618 | 1/1966 | Manahan et al. | 424/52 |

FOREIGN PATENTS

| 1,462,193 | 11/1966 | France | |

Primary Examiner—Richard L. Huff
Attorneys—Herbert S. Sylvester, Murray M. Grill, Norman Blumenkopf, Ronald S. Cornell, Thomas J. Corum, Richard N. Miller and Robert L. Stone

ABSTRACT: A flavor composition which simulates the flavor of chloroform. The composition contains methylene chloride a nontoxic perfluoro saturated hydrocarbon. The flavor composition is particularly suitable for use in an oral preparation.

FLAVOR COMPOSITION

This invention relates to a flavor composition which simulates that unusual flavor of chloroform.

Because of its unusual flavor, chloroform has come into use in various compositions where the characteristics of its biting taste perfluoro desired. Among the compositions in which chloroform has been used as a flavor, oral preparations are particularly noteworthy.

The effect of chloroform flavor quickly diminishes after the initial contact with the oral cavity.

It is an object of this invention to provide a flavor composition which immediately simulates the unusual flavor of chloroform and continues to provide the flavor during the entire period of contact of the flavor composition with the oral cavity. Other objects will be apparent from consideration of the following specification.

In accordance with certain of its aspects this invention relates to a flavor composition comprising methylene chloride and a nontoxic perfluoro saturated hydrocarbon.

It has been unexpectedly found that when methylene chloride is mixed with a nontoxic perfluoro saturated hydrocarbon of the type commonly used in propellents and stored under pressure at low temperature, say about 5° C-15° C., desirable and unusual ethereal effect of chloroform is substantially simulated. Moreover, the flavor rapidly develops and remains satisfying during the time the flavor composition is in contact with the oral cavity.

Typical nontoxic fluorohydrocarbons which may be employed are those acyclic (two to six carbon atoms) and cyclic (three to six carbon atoms) materials containing two to six carbons atoms. This includes hexafluoroethane, octofluoropropane, decafluorobutane, dodecafluoropentane, and tetrafluorohexane, hexafluorocyclopropane, octafluorocyclobutane, decafluorocyclopentane and dodecafluorocyclohexane. The preferred fluorocarbon is octafluorocyclobutane.

Generally, the components of the flavor provide their desirable taste when the composition contains about 0.5-3.0 parts, preferably about 1 part by weight of perfluorohydrocarbon for each 100 parts of methylene chloride present.

In accordance with certain aspects of this invention, the flavor components are incorporated into a carrier material to provide for contact with the oral cavity. Preferably the incorporation is performed at about the temperature at which the flavor components are stored, say about 4.5° C. Typically based on the entire composition the flavor composition contains about 1.5-40 percent by weight of methylene chloride and about 0.5-3.0 parts by weight, preferably about 1 part, of perfluorohydrocarbon for each 100 parts by weight of methylene chloride present.

The carrier material may be any material for which when brought into contact with the oral cavity, it is desirable to provide a long-lasting desirable biting flavor such as has been provided by chloroform for shorter periods of time. Typically, such a carrier is a dentifrice. The flavor generally comprises about 0.5-3.3 percent by weight, preferably about 0.5-1.5 percent of the total composition.

The flavor compositions normally have a pH between about 5 and 9 and preferably about 6-7. If desired, the pH may be maintained with a buffering system.

When the carrier material is a dentrifrice there is present therein a substantially water-insoluble polishing agent of the type commonly employed in dental creams, chewable tablets and powders. There is a relatively large number of such materials known in the art. Representative materials include, for example, dicalcium phosphate, tricalcium phosphate, insoluble sodium metaphosphate, aluminum hydroxide, magnesium carbonate, calcium carbonate, calcium pyrophosphate, calcium sulfate, polymethylmethacrylate bentonite, etc., including suitable mixtures thereof. It is preferred to use the water-insoluble phosphate salts as the polishing agents and more particularly, insoluble sodium metaphosphate and/or a calcium phosphate, such as dicalcium phosphate dihydrate. The polishing agent may be the sole carrier material, particularly when the dentifrice is a toothpowder. Typically, other ingredients are present in the carrier and the amount of polishing agent is up to 95 percent, by weight of the carrier. In the case of a dental cream or chewable tablet the polishing agent is generally about 20-75 percent by weight of the carrier and in a toothpowder it is generally about 70-95 percent by weight of the carrier.

In the preparation of a toothpowder it is usually sufficient to admix mechanically the ingredients of the carrier with methylene chlorine to which the fluorohydrocarbon has been added.

In dental cream formulations, the liquids and solids should necessarily be proportioned to form a creamy mass of desired consistency which is extrudable from a pressurized container or a collapsible, e.g., aluminum or lead, tube. In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20-75 percent by weight of the carrier. It is preferred to use also a gelling agent in dental creams such as the natural and synthetic gums and gumlike materials, e.g., Irish moss, gum tragacanth, sodium carboxymethyl cellulose, polyvinylpyrrolidone, starch, and the like, usually in an amount up to about 10 percent by weight, and preferably about 0.2-5 percent of the carrier.

The components of the flavor of the invention are blended into such dental cream formulations. In chewable dental tablets the solids and liquids are proportioned similarly to the amounts in dental creams and the flavor is blended with the solids and liquids, a waxy matrix such as polyethylene glycol having a molecular weight of about 6,000 by weight, generally in amount of about 4-20 percent by weight, in order to facilitate forming a tablet of desired size and shape.

In other oral preparations, such as mouthwashes and the like, the carrier is an aqueous vehicle which may comprise about 20-99 percent by weight of the preparation. Typically, the vehicle also includes about 5-30 percent by weight of a nontoxic alcohol, such as ethanol.

Organic surface-active agent may be used in the carrier of the present invention to assist in achieving thorough and complete dispersion of the instant compositions throughout the oral cavity, and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monosulfates, such as the sodium salt of the monosulfated monoglyceride of hydrogenated coconut oil fatty acids, higher alkyl sulfates, such as sodium dodecylbenzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last-mentioned amides are N-lauroyl sarcosine, and the sodium, potassium, and ethanolamine salts of N-lauroyl, N-myristoyl or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface-active materials include nonionic agents such as condensates of sorbitan monostearate with approximately 60 moles of athylene oxide, condensates of propylene glycol ("Pluronics") and cationic surface-active germicides and antibacterial compounds such as di-isobutylphenoxyethoxyethyl ammonium chloride, tertiary amines having one fatty alkyl group (of from 12 to 18 carbon atoms) and two (poly)oxyethylene groups attached to the nitrogen (typically) containing a total of from about two to 50 ethenoxy groups pr molecule) and salts thereof with acids, and compounds of the structure

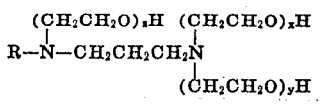

where R is a fatty alkyl group containing from about 12 to 18 carbon atoms, and x, y and z total 3 or higher, as well as salts thereof with mineral or organic acids.

It is preferred to use the surface-active agent in amount of about 0.05–5 percent by weight of the carrier.

Various other materials also may be incorporated in the carrier. Examples thereof are coloring or whitening agents, preservatives, silicones, chlorophyll compounds, ammoniated materials such as urea, diammoniumphosphate and mixtures thereof and other constituents. These adjuvants are incorporated in the instant compositions in amounts which do not substantially adversely affect the properties and characteristics suitably selected and used in proper amount depending upon the particular type of preparation involved.

It may be desirable too, to include antibacterial agents in the carrier, typically in amount of about 0.001–5 percent, preferably about 0.05–1.0 percent, of weight of the carrier typical antibacterial agents include:

N$^1$-(4-chlorobenzyl)-N$^5$-(2,4-dichlorobenzyl) biguanide;
p-chlorophenyl biguanide;
4-chlorobenzhydrl biguanide;
4-chlorobenzhydrylguanylurea;
N-3-lauroxypropyl-N$^5$-p-chlorobenzylbiguanide;
1,6di-p-chlorophenylbiguanidohexane
1-(lauryldimethylammonium)-8-(pchlorobenzyldimethylammonium) octane dichloride;
5,6-dichloro-2-guanidinobenzimidazole;
N$^1$-p-chlorophenyl-N$^5$-laurylbiguanide;
5-amino-1, 3-bis(2-ethylhexyl)-5-methylhexahydro pyrimidine;
and their nontoxic acid addition salts.

In addition to the flavor of the instant invention, additional flavoring or sweetening materials, of the type commonly employed in dentrifrices, may be included in the carrier. Such materials, if present, aid in modifying the particular tastes of the flavor in the manner desired. Examples of such additional materials include the flavoring oils, for example, oils of spearmint, peppermint, wintergreen, sassafras, clove, sage, eucalyptus marjoram, cinnamon, lemon and orange, as well as sodium methylsalicylate. Suitable sweetening agents include sucrose, lactose, maltose, sorbitol, sodium cyclamate, and saccharine. Suitably, flavor and sweetening agent may together comprise about 0.01–2.0 percent by weight of the carrier.

The carrier suitably may contain a flourine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride (SnF$_2$.KF), sodium hexafluorostannate, stannous chloroflouride, sodium flourizirconate, and sodium monofluorophosphate. These materials, which dissociate or release flourine containing ions in water, suitably may be present in the carrier in an effective but nontoxic amount, usually within the range of about 0.01 to 1 percent by weight of the water-soluble fluoride content thereof.

The following specific examples are further illustrative of the nature of the present invention but is is to be understood that the invention is not limited thereto. The amounts and proportions in the examples are by weight unless otherwise indicated.

EXAMPLE 1

3.2 parts of a pressurized composition (about 0.77 kgs./cm.$^2$) containing 99 percent methylene chloride and 1 percent perfluorocyclobutane are stored under pressure at 4.5° C.

The methylene chloride and perfluorocyclobutane are then blended at 4.5° C. with the following dental cream carriers:

| Components | Parts A | B | C |
| --- | --- | --- | --- |
| Glycerine | 25.7 | 28.5 | 25.1 |
| Carboxymethyl cellulose | 0.75 | | |
| Irish moss | | 1.3 | 1.3 |
| Tetrasodium pyrophosphate | 0.25 | | 0.25 |
| Sodium benzoate | 0.5 | 0.15 | 0.5 |
| Saccharine | | | 0.2 |
| Water | 14.6 | 17.4 | 13.9 |
| Sodium lauryl sulfate | 1.0 | 1.5 | 1.0 |
| Stannous fluoride | | 0.4 | |
| Sodium monofluorophosphate | | | 0.76 |
| Dicalcium phosphate | 46.7 | 15.0 | 46.7 |
| Calcium carbonate | 5.0 | | 5.0 |
| Insoluble sodium metaphosphate | | 30.6 | |
| Color | | 0.4 | |

When the teeth are brushed with these compositions, a biting flavor simulating the flavor of chloroform immediately develops and remains in the oral cavity throughout the time of brushing and for a short period thereafter.

In the above example hexafluoroethane, hexafluorocyclopropane, tetradecafluorohexane and dodecafluorocyclohexane may replace octafluorocyclobutane.

EXAMPLE 2

3.2 parts of the pressurized composition of example 1 are blended with the following mouthwash carrier:

| Components | Parts |
| --- | --- |
| Ethyl Alcohol (95%) | 14.8 |
| Sorbitan Monostearate Polyoxyethylene Condensate Containing About 80 Moles of Ethylene Oxide | 2.5 |
| Glycerine (99.3%) | 10.0 |
| Water | 71.6 |
| Color | 0.6 |
| Citric Acid | 0.03 |

During washing of the mouth a biting flavor simulating the flavor of chloroform immediately develops and remains in the oral cavity throughout the time of contact and for a short period thereafter.

EXAMPLE 3 three and two-tenths parts of the pressurized composition of example 1 are blended with the following chewable dental tablet carrier:

| Components | Parts |
| --- | --- |
| Dicalcium Phosphate | 76.0 |
| Sodium Lauryl Sulfate | 0.5 |
| Hydrogenated Coconut Oil Monoglyceride Sulfate Sodium Salt | 1.2 |
| Di-isobutyl Phenoxyethyl Dimethylbenzyl Ammonium Chloride | 0.1 |
| Polyethylene Glycol 6000 | 10.0 |
| Starch | 2.5 |
| Carboxymethyl Cellulose | 1.25 |
| Silicon Dioxide | 1.25 |
| Polyvinyl Alcohol | 2.9 |
| Talc | 2.0 |

During chewing of this tablet and brushing of the teeth, a biting flavor simulating the flavor of chloroform immediately develops and remains in the oral cavity throughout the time of contact and for a short period thereafter.

It will be apparent to those skilled in the art that various modifications may be made to the specific compositions described and equivalents substituted therefor.

We claim:

1. A flavor composition comprising methylene chloride and a nontoxic perfluoro saturated hydrocarbon, wherein said perfluoro saturated hydrocarbon contains two–six carbon atoms and said perfluoro saturated hydrocarbon is present in amount of about 0.5–3.0 parts by weight for each 100 parts of methylene chloride present.

2. The flavor composition claimed in claim 1 wherein said perfluoro saturated hydrocarbon is present in amount of about 1 part by weight for each 100 parts of methylene chloride present.

3. The flavor composition of claim 1 wherein there is present a carrier for the methylene chloride and perfluoro saturated hydrocarbon, and said composition comprises 1.5–4.0 percent by weight of methylene chloride.

4. The flavor composition of claim 3 wherein said carrier is an aqueous vehicle.

5. The flavor composition of claim 4 wherein said aqueous vehicle contains about 5–30 percent by weight of a nontoxic alcohol.

UNITED STATES PATENT OFFICE
CERTIFICATE OF CORRECTION

Patent No. 3,608,068                    Dated September 21, 1971

Inventor(s) George H. Fuller and Stephen Klisch

It is certified that error appears in the above-identified patent and that said Letters Patent are hereby corrected as shown below:

Column 1, line 6 delete "perfluoro" and substitute --are--;
line 48 delete "40" and substitute --4.0--;
line 53 delete "desirable" and substitute --desired--.
Column 2, line 74 delete "athylene" and substitute --ethylene--.
Column 3, line 5 delete "(typically)" and substitute --(typically-
line 6 delete "pr" and substitute --per--;
line 30 delete "0.001" and substitute --0.01--;
line 35 delete "chlorobenzhydrl" and substitute --chlorobenzhydryl--;
line 38 delete "1,6di-" and substitute --1,6-di---;
line 39 delete "(pchlorobenzyldi-" and substitute --(p-chlorobenzyldi---;
line 72 delete "is is" and substitute --it is--.
Column 4, line 53 delete "three and two-tenths" and substitute --3.2--.

Signed and sealed this 28th day of November 1972.

(SEAL)
Attest:

EDWARD M. FLETCHER, JR.
Attesting Officer

ROBERT GOTTSCHALK
Commissioner of Patents